Sept. 13, 1960    F. E. BACHMAN    2,952,223
PNEUMATIC SUSPENSION FOR USE ON FREIGHT CAR TRUCKS
Filed May 17, 1955    2 Sheets-Sheet 1
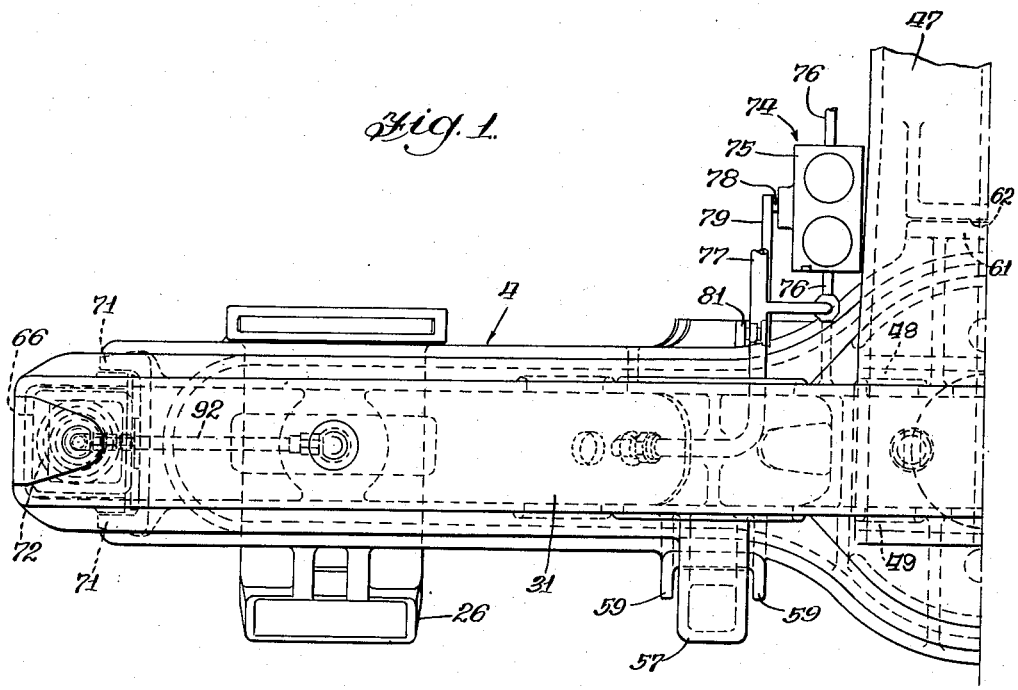
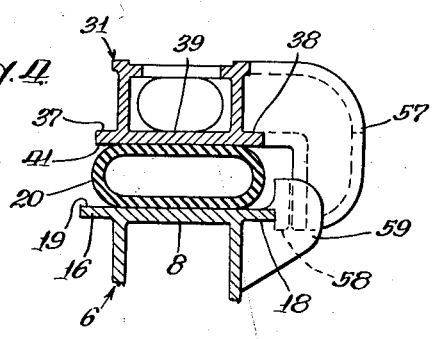
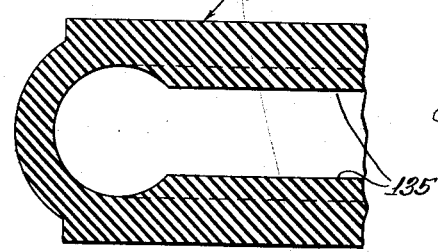
INVENTOR.
Fred E. Bachman
BY
Walter L. Schlegel, Jr. Atty.
Witness:
Charles H. Barrett Sept. 13, 1960  F. E. BACHMAN  2,952,223
PNEUMATIC SUSPENSION FOR USE ON FREIGHT CAR TRUCKS
Filed May 17, 1955  2 Sheets-Sheet 2

INVENTOR.
Fred E. Bachman
BY
Walter L. Schlegel, Jr. Atty.

Witness:
Charles H. Bassett

United States Patent Office

2,952,223
Patented Sept. 13, 1960

2,952,223

PNEUMATIC SUSPENSION FOR USE ON FREIGHT CAR TRUCKS

Fred E. Bachman, Granite City, Ill., assignor to American Steel Foundries, Chicago, Ill., a corporation of New Jersey Filed May 17, 1955, Ser. No. 508,997

1 Claim. (Cl. 105—197)

This invention relates to pneumatic suspensions for use on freight car trucks, and more particularly to a pneumatic suspension arrangement which is designed to replace conventional bolster spring groups of the type seated on truck frames to resiliently support a bolster and car body.

An object of the invention resides in the provision of a pneumatic suspension arrangement which is relatively simple and inexpensive to manufacture and reliable in use.

Another object of the invention resides in the provision of a pneumatic suspension arrangement adapted to provide a freight car with optimum riding qualities.

Another object of the invention resides in the provision of a side frame comprising upper and lower sections of substantially equal length, the upper section being resiliently supported throughout its length upon an elongated inflated pad seated upon the lower section.

Another object of the invention resides in the provision of means adapted to guide and maintain the upper and lower frame sections in vertical alignment during relative movement between said sections.

Another object of the invention resides in the provision of a lower frame section having journal boxes to receive wheel and axle assemblies, and an upper frame section having a window to receive a bolster.

Another object of the invention is to provide a truck having upper frame sections secured in predetermined spaced relationship by a bolster, and lower frame sections having inboard flanges in abutting engagement with the bolster.

The invention embodies other novel features, details of construction and arrangement of parts which are hereinafter set forth in the specification and claims and illustrated in the accompanying drawings, wherein:

Figure 1 is a fragmentary top plan view illustrating a pneumatic suspension for use on freight car trucks;

Figure 4 is a detail sectional view taken along the line 4—4 of Figure 2; and

Figure 5 is an enlarged fragmentary detail sectional view illustrating an inflatable pad.

Figure 2:
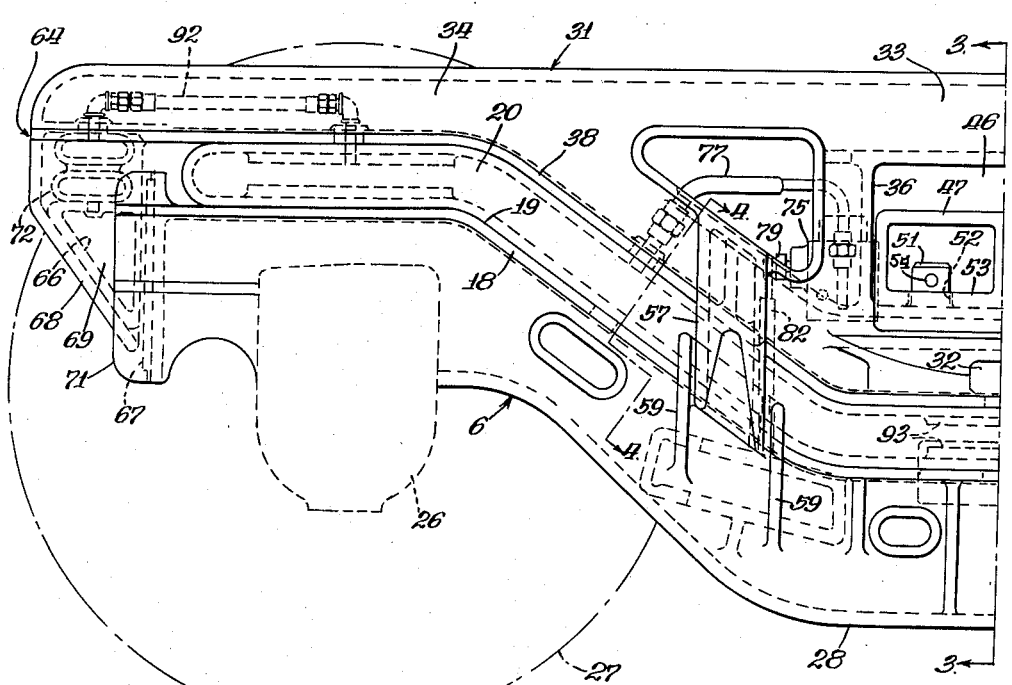
Figure 2 is a side elevational view of same.

Referring now to the drawings for a better understanding of the invention and more particularly to Figures 1 to 4 therein, a freight car truck embodying a pneumatic suspension arrangement is shown as comprising spaced side frames 4—4. As the side frames are identical and also symmetrical about their transverse center lines, only one end of one frame has been shown.

Each side frame 4 comprises a lower frame member 6 of generally box section formed by a top wall 8, bottom wall 10, and inboard and outboard side walls 12 and 14, respectively. Inboard and outboard side flanges 16 and 18, respectively, extend along opposite sides of the lower frame member and merge with the top wall 8 to form therewith a relatively wide lower seat 19 to support a hollow elongated pad 20 adapted to be inflated with air under pressure, as hereinafter described, the pad being formed with bosses 22 snugly engageable with apertures 24 provided in the seat 19. Gussets 25 are provided on opposite sides of the lower frame member 6 to reinforce the side flanges 16 and 18.

Suitable journal boxes 26 are provided adjacent the ends of the lower frame member 6 and preferably cast integral therewith to receive conventional wheel and axle assemblies 27. The lower side frame member 6 is preferably of drop-center design having a medial portion 28 disposed below a horizontal plane through the axes of the wheel and axle assemblies 27 and merging with upwardly diverging portions 29.

An upper side frame member 31 is mounted upon the pad 20 above and coplanar with the lower side frame member 6 and is shown in the form of a cast truss structure having a tension portion 32 and a compression portion 33 merging at their ends with end portions 34, said tension and compression portions being interconnected adjacent the center of the frame member by spaced columns 36—36. To provide maximum strength and minimum weight, the portions 32, 33 and 34 of the upper side frame member are of box section.

The tension portion 32 and end portions 34 are provided with inboard and outboard flanges 37 and 38, respectively, merging with a bottom wall 39 to form an upper seat 41 having a contour and width substantially complementary to the lower seat 19 whereby the pad 20 may be of substantially uniform height or thickness and may be interposed between said seats 19 and 41. Ribs 42 are provided on opposite sides of the tension portion 32 to reinforce the side flanges 37 and 38, and the flanges are provided with apertures 43 to receive bosses 44 formed on the pad 20.

The tension and compression portions 32 and 33 and columns 36—36 define a window 46 to receive the end of a bolster 47 formed with depending inboard and outboard flanges or lugs 48 and 49, respectively, to engage opposite sides of the tension portion 32. The tension portion 32 is provided with a plurality of bosses 51 to project upwardly through apertures 52 formed in the bottom wall 53 of the bolster, each boss having an aperture 54 to receive a cotter pin or the like (not shown) to prevent accidental displacement of the bolster from the upper side frame member 31.

To maintain the upper and lower side frame members in substantially vertical alignment, spaced guide arms 57—57 are provided on the outboard side of the tension portion 32 for vertical reciprocative sliding engagement along outer abutment guide flanges 58 formed on the outboard flange 18 and between side guide flanges 59—59. An inner abutment flange 61 is provided on the inboard flange 16 for abutting sliding engagement along a vertical surface 62 of a bracket 63 provided on the bolster 47.

A snubber housing 64 projects downwardly from each end of the upper side frame member 31 to receive a wedge-shaped snubber 66 for frictional engagement aginst a vertical friction surface 67 formed on the related adjacent end of the lower side frame member, the housing comprising a diagonal wall 68 inclined downwardly and inwardly toward said friction surface, and side walls 69—69 interconnected by said diagonal wall. Spaced parallel guide flanges 71—71 project outwardly from each end of the lower frame member to straddle their related snubber housing 64 and to serve to maintain the upper and lower side frame members in proper vertical alignment.

An inflatable cushion 72 is provided in each housing 64 to engage and urge its respective snubber 66 downwardly and inwardly against its related friction surface 67 to dampen relative vertical movement of the upper and lower side frame members.

Figure 3:
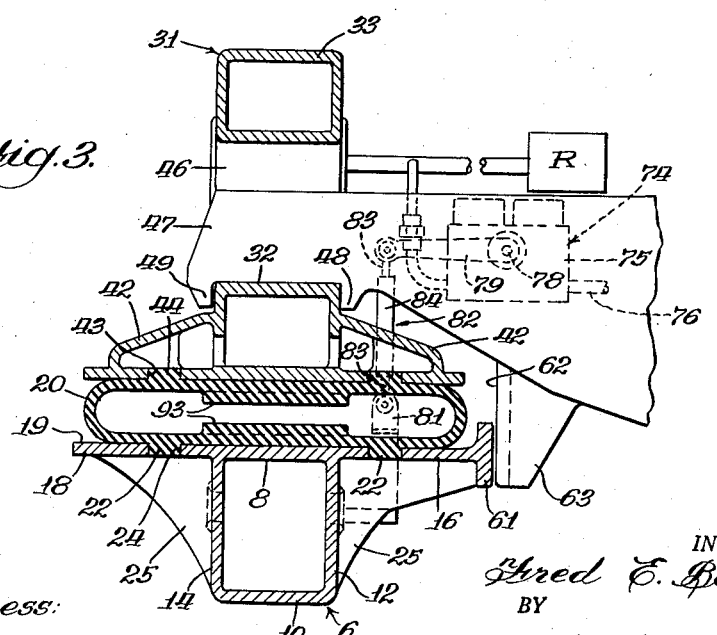
Figure 3 is a transverse sectional view taken along the line 3—3 of Figure 2.

The air pressure within the hollow elongated pad 20 of each side frame is automatically regulated responsive to variations in the weight of the car body in loaded or unloaded conditions by means of an independent air pressure control system shown as comprising a control valve 74, Figure 3, having a body 75 secured in fixed position on the bolster 47 and connected to an air inlet conduit 76 leading from an air compressor or other source of air supply (not shown). An exhaust conduit 77 between the pad 20 and an air reservoir R is connected to the valve body 75.

As illustrated in Figure 5, the cushions 107 may be formed with opposed bosses 135 for abutting engagement in the event the air pressure in the cushions should, for any reason, fail to support the load thereon.

I claim:

In a railway car truck, the combination of: a plurality of spaced wheel and axle assemblies; a pair of independent longitudinally extending side frame members supported on said assemblies; and a transversely extending bolster member interconnecting said side frame members; each of said side frame members comprising a pair of vertically spaced upper and lower sections presenting mutually facing parallel surfaces extending substantially the length of the side frame members between the wheel and axle assemblies and an elongated hollow inflatable pad compressibly interposed between the surfaces of the respective sections to provide resilient support for the upper section on the lower section, said pad presenting opposed parallel upper and lower surfaces engageable with the surfaces of the respective side frame member sections; means to restrict relative lateral movement between the surface of each side frame member section and its engaging pad surface comprising lug means protruding from one surface and received within recess means of the other surface; the lower section being non-resiliently connected to the wheel and axle assemblies and the upper section being non-resiliently connected to the bolster.

References Cited in the file of this patent

UNITED STATES PATENTS

| | | |
|---|---|---|
| 779,858 | Lillie | Jan. 10, 1905 |
| 1,008,290 | Verge | Nov. 7, 1911 |
| 2,190,762 | Anderson | Feb. 20, 1940 |
| 2,355,450 | Leese | Aug. 8, 1944 |
| 2,389,840 | Bruce | Nov. 27, 1945 |
| 2,537,637 | Candlin et al. | Jan. 9, 1951 |
| 2,633,811 | Poage | Apr. 7, 1953 |
| 2,758,549 | Lich | Aug. 14, 1956 |

FOREIGN PATENTS

| | | |
|---|---|---|
| 473,848 | Great Britain | Oct. 20, 1937 |